United States Patent [19]

Jones et al.

[11] 4,204,830
[45] May 27, 1980

[54] METHOD AND APPARATUS FOR CONTROLLING BURNER-AIR-FUEL RATIO

[75] Inventors: William M. Jones, Parma; Mark S. Freas, Cleveland, both of Ohio

[73] Assignee: The North American Manufacturing Company, Cleveland, Ohio

[21] Appl. No.: 827,931

[22] Filed: Aug. 26, 1977

[51] Int. Cl.$^2$ .............................................. F23C 5/00
[52] U.S. Cl. ...................................................... 431/8
[58] Field of Search ....................... 236/15; 431/8, 90

[56] References Cited

U.S. PATENT DOCUMENTS

| | | | |
|---|---|---|---|
| 2,366,170 | 1/1945 | Bates | 236/15 |
| 2,780,414 | 2/1957 | De Heer | 236/15 |
| 2,866,602 | 12/1958 | Dailey, Jr. et al. | 236/15 |
| 3,388,862 | 6/1968 | Gabrielson | 431/8 |
| 3,407,022 | 10/1968 | Andrews et al. | 431/8 |
| 3,424,378 | 1/1969 | Martin | 236/15 BD |
| 3,493,005 | 2/1970 | Kakegowa | 137/100 |

Primary Examiner—Richard E. Moore

[57] ABSTRACT

When a burner is supplied with preheated air, the temperature and density of the preheated air may vary during operation of the burner. When the density of the air supplied to a burner varies, it is necessary to vary the rate at which fuel is supplied to the burner in order to maintain a predetermined air-fuel ratio. To effect a variation in fuel flow with burner air density, the present invention utilizes a secondary air flow to simulate the heated flow of air to the burner. The flow rate of the secondary air varies in a manner which is a direct function of variations in the rate of flow of the heated burner air. Changes in the rate of flow of the secondary air are sensed at a predetermined reference temperature. The sensed variations in the secondary air flow are utilized to effect a corresponding change in the rate of fuel flow to maintain a constant air-fuel ratio.

41 Claims, 6 Drawing Figures

METHOD AND APPARATUS FOR CONTROLLING BURNER-AIR-FUEL RATIO

BACKGROUND OF THE INVENTION

The present invention relates to a new and improved method and apparatus for controlling the air-fuel ratio at a burner.

The air-fuel ratio at a burner has previously been controlled by using impulsed regulators to keep the fuel and air pressures equal. If the two pressures are maintained equal, the fuel and air flow rates are maintained proportional throughout a range of firing rates. However, this system is ineffective if the density of the air varies during operation of the burner.

A known system for controlling the characteristics of a main burner flame includes a control burner which is supplied with the same gas/air mixture as the main burner. The heat released from the control burner is sensed and the gas/air mixture is varied to keep the total heat released by the control burner constant to thereby maintain the heat released by the main burner constant. This system is disclosed in U.S. Pat. No. 3,407,022. Other systems utilizing auxiliary burners to control the flow of fuel to working burners are disclosed in U.S. Pat. Nos. 2,780,414 and 2,366,170. Known systems for controlling air-fuel ratios are disclosed in U.S. Pat. Nos. 2,866,602 and 3,493,005.

SUMMARY OF THE PRESENT INVENTION

The present invention provides a new and improved method and apparatus for controlling the air-fuel ratio at a burner. The invention is advantageously utilized in association with a recuperator which is effective to preheat the air supplied to the burner to thereby improve its operating efficiency. As the air is heated by the recuperator, the density of the air decreases with a resulting decrease in the air mass flow rate conducted to the burner even though the volumetric air flow rate may be maintained constant. In order to maintain a desired air-fuel ratio, it is necessary to decrease the rate of fuel flow to the burner as the density of the air decreases. This is because the air-fuel ratio is determined by the ratio of the mass of air to the mass of fuel.

In accordance with one feature of the present invention, the flow of fuel to the burner is controlled by simulating the flow of burner air with a secondary or control air flow. The secondary air flow is heated to the same temperature as the air supplied to the burner and is maintained at the same pressure as the air supplied to the burner. The secondary air flow is directed through a control orifice. The air pressure differential across the control orifice is equal to the air pressure differential across the burner. Since the burner functions as an orifice and the air supplied to the burner has the same density and pressure as the air supplied to the control orifice, the flow of secondary air through the control orifice varies as a direct function of variations in the flow of air to the burner.

By sensing variations in the rate of flow of the secondary air before it is heated and while the temperature of the secondary air is at a standard or reference temperature, it is possible to provide a control signal which varies as a function of the variations in the flow of burner air as measured at the reference temperature. This control signal is utilized to vary the rate of flow of fuel to the burner. Therefore, the fuel flow rate varies as a direct function of variations in the burner air flow rate as measured at the reference temperature to maintain a constant air-fuel ratio with varying burner air density.

When relatively cold air is being supplied to the burner at a predetermined pressure, it will contain substantially more oxygen per cubic foot than relatively warm air. If the volumetric air flow rate is the same for warm and cold air, substantially more fuel will be required to maintain the same air-fuel ratio for the cold air than for the warm air. It is contemplated that it may be desirable to limit the burner fuel capacity to what is required at the highest operating burner air temperature. In order to accomplish this, a limiting system is provided to limit the burner air flow to a flow rate which corresponds to a maximum fuel flow rate.

Accordingly, it is an object of this invention to provide a new and improved method and apparatus for controlling the air-fuel ratio for a burner and wherein a secondary or control air flow is utilized to simulate the burner air flow, the air-fuel ratio being maintained substantially constant by regulating the flow of fuel to the burner as a function of the secondary air flow.

Another object of this invention is to provide a new and improved method and apparatus as set forth in the next preceding object wherein the pressure and density of the secondary air flow are varied as a function of variations in the pressure and density of the burner air.

Another object of this invention is to provide a new and improved method and apparatus for controlling the air-fuel ratio at a burner and wherein a control signal varies as a function of variations in the air mass flow rate of heated air to the burner and this control signal is utilized to effect a variation in the rate of fuel flow to the burner to maintain a predetermined air-fuel ratio with variations in the temperature and density of the burner air flow.

Another object of this invention is to provide a new and improved method and apparatus for controlling the air-fuel ratio at a burner with variations in the temperature of the burner air and wherein the flow of relatively cold burner air is limited to a rate which is less than a maximum volumetric flow rate of heated air to obtain a desired air-fuel ratio with cold air and with heated air at the same maximum fuel flow rate.

BRIEF DESCRIPTION OF THE DRAWINGS

The foregoing and other objects and features of the present invention will become more apparent upon a consideration of the following description taken in connection with the accompanying drawings wherein.

DESCRIPTION OF SPECIFIC PREFERRED EMBODIMENTS OF THE INVENTION

Figure 1:
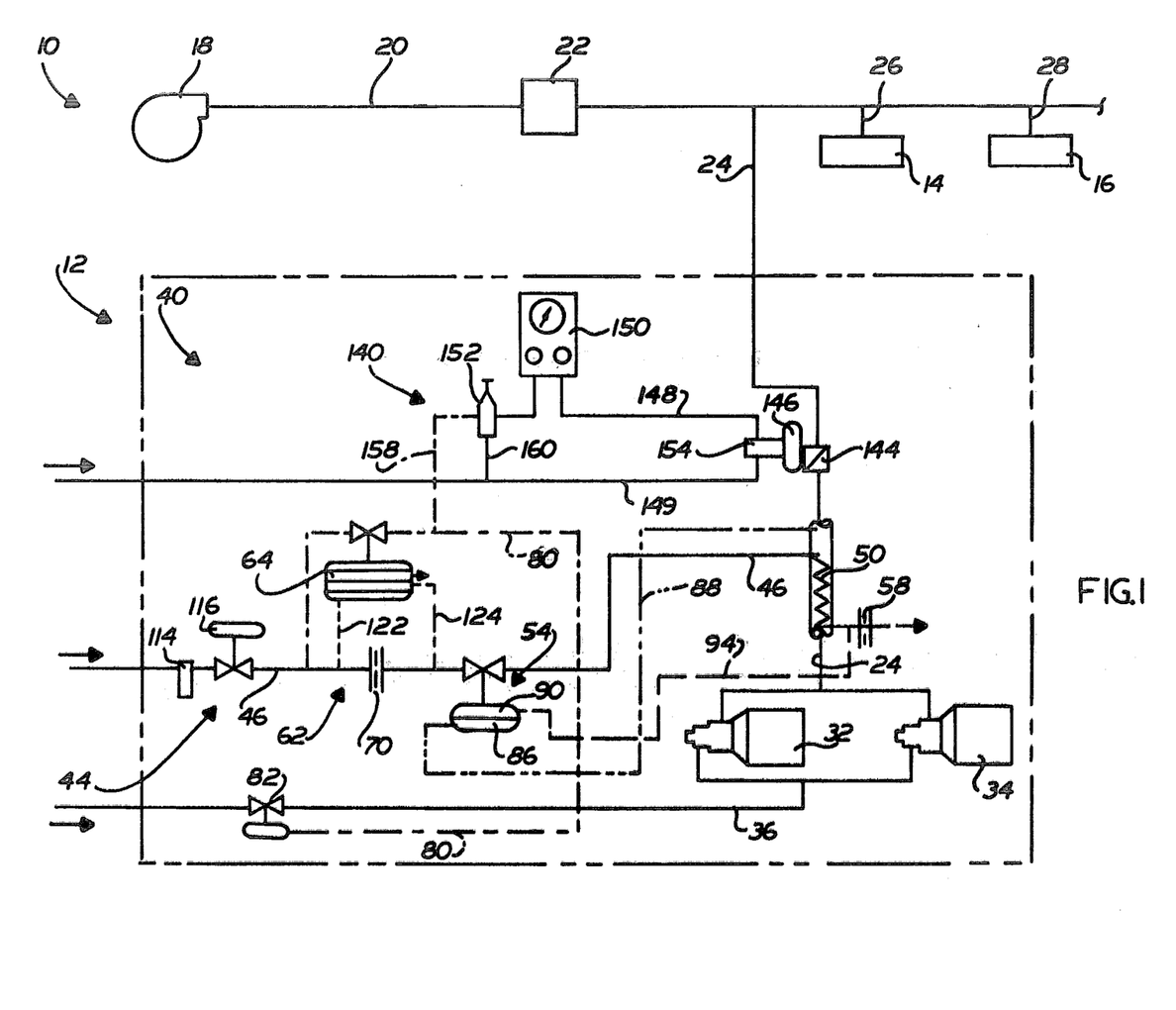
FIG. 1 is a schematic illustration of a system for controlling the air-fuel ratio for a plurality of burners which are supplied with preheated air from a recuperator.

A heating system 10 is illustrated schematically in FIG. 1 and includes a plurality of similar burner zones 12, 14 and 16 which are supplied with air from a common source or blower 18. In order to improve the efficiency of the heating system, the air from the burner 18 is conducted through a main conduit 20 to a recuperator 22 which heats the air. The air from the recuperator 22 is divided between a plurality of burner conduits 24, 26, and 28 to direct a heated flow of burner air to each of the zones 12, 14 and 16.

The zone 12 includes a pair of burners 32 and 34 which are supplied with a suitable fuel, such as natural gas, through a fuel line or conduit 36. A control assembly 40 is provided to maintain a predetermined air-fuel ratio at the burners 32 and 34 even though the temperature and density of the air supplied to the burners through the conduit 24 may vary due to the action of the recuperator 22. Although a pair of burners 32 and 34 are illustrated in FIG. 1, a single burner could be used at each zone if desired.

The control assembly 40 senses variations in the air mass flow rate of heated air through the conduit 24 to the burners 32 and 34. The control assembly then varies the rate of flow of fuel through the conduit 36 to the burners 32 and 34 to maintain the air-fuel ratio at the burners constant even though the density of the burner air and its mass flow rate varies. To this end the control assembly 40 includes a secondary or control air flow system 44 which varies the air mass flow rate in a conduit 46 as a direct function of variations in the air mass flow rate of burner air in the conduit 24.

Figure 2:
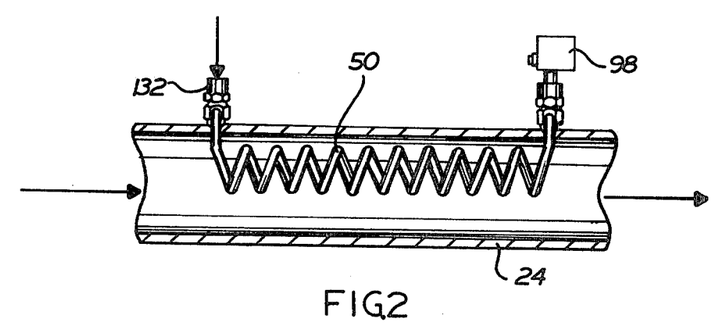
FIG. 2 is a sectional view illustrating the manner which a coil is utilized to heat control or secondary air to the same temperature as the burner air.

The air in the secondary or control air flow conduit 46 is heated to the same temperature as the burner air flow in the conduit 24 as the secondary air flows through a heating coil 50. The heating coil 50 forms part of the conduit 46 and is disposed in a section of the conduit 24 (see FIGS. 1 and 2). A disphragm type pressure regulator 54 maintains the pressure of the air in the secondary conduit 46 at orifice 58 equal to the pressure of the air in the burner air flow conduit 24.

In order to provide for a variation in the flow rate of the secondary air in the conduit 46 in a manner which simulates the flow rate of the air in the burner conduit 24, a control orifice 58 is provided to simulate the air flow orifices in the two burners 32 and 34. Each of the burners 32 and 34 acts as an orifice through which the heated burner air from the conduit 24 is directed to a combustion chamber. The air flow rate through the burners 32 and 34 and through the control orifice 58 is a function of the area of the orifice, the pressure differential across the orifice and the specific weight or density of the air. The rate of flow of the burner and/or secondary air increases as the pressure differential across the orifices increases. The volumetric flow rate through the orifices increases as the air is heated and its density decreases.

The pressure differential across the control orifice 58 is the same as the air pressure differential across the burner orifices. This is because both the burner combustion chambers and the downstream side of the control orifice 58 are at atmospheric pressure and the regulator 54 maintains the pressure in the secondary air flow conduit 46 at orifice 58 equal to the pressure in the burner air flow conduit 24.

The temperature of the air which flows through the control orifice 58 is the same as the temperature of the air which is conducted to the burners 32 and 34. This is because the secondary air is heated to the same temperature as the burner air while the secondary air is flowing through the coil 50. Since the temperature and pressure of the air in the burner and secondary air flows are equal when these air flows pass through their respective orifices, the density of the air flowing through the orifice 58 is the same as the density of the air flowing through the orifices in the burners 32 and 34.

The actual air flow rate through the conduit 24 to the burners 32 and 34 is substantially greater than the actual air flow rate in the secondary conduit 46. This is because the orifices at the burners 32 and 34 are substantially greater in area than the orifice 58. However, the rate of flow of air through the secondary conduit 46 varies as a direct function of variations in the rate of flow of air through the conduit 24. This is because the secondary air flowing through the orifice 58 has the same density as the burner air and is at the same pressure as the burner air. Therefore, the rate of secondary air flow through the conduit 46 varies in a manner which simulates variations in the rate of flow of burner air through conduit 24.

In order to maintain the air-fuel ratio at the burners 32 and 34 constant, it is necessary to reduce the mass flow rate of fuel through the conduit 36 to compensate for the reduction in the mass flow rate of burner air as the recuperator 22 becomes effective to heat the burner air. Thus, when the burners 32 and 34 are started, the recuperator 22 will be relatively cold and substantially ineffective to heat the burner air flow. During the operation of the burners 32 and 34, the temperature of the recuperator 22 increases and the recuperator becomes effective to heat the burner air flow. As the temperature of the air supplied to the burners 32 and 34 is increased, the density and oxygen content of each cubic foot of burner air is decreased.

Assuming that the blower 18 is effective to maintain the same volumetric flow rate to the burners 32 and 34, the mass air flow rate to the burners 32 and 34 decreases as the temperature of the burner air rises and its density decreases. The temperature and density of the fuel supplied to the burners 32 and 34 remains substantially constant. Therefore if the rate of flow of fuel to the burner is maintained constant as the mass air flow rate to the burners decreases, the air-fuel ratio will decrease and the mixture supplied to the burners will be relatively rich.

In order to maintain a constant air-fuel ratio at the burners 32 and 34 as the temperature of the burner air varies due to the action of the recuperator 22, it is necessary to vary the rate at which fuel is supplied to the burners 32 and 34. To maintain a constant ratio between the air mass flow rate and fuel mass flow rate, the present invention senses variations in the air mass flow rate. This could be done by sensing the burner air flow rate before it is heated by the recuperator 22. However, the air from the recuperator 22 is being supplied to at least three different zones, that is the zones 12, 14 and 16. The air flow rate to each of the zones will vary due to temperature controls associated with each of the zones. Therefore, the air flow rate to a particular zone and to a particular burner or pair of burners cannot be determined by merely measuring the flow rate of unheated air from the blower 18.

The rate of flow of secondary air in the conduit 46 varies as a direct function of variations in the flow rate of burner air supplied to the zone 12 through the conduit 24. Therefore if the fuel flow rate to zone 12 is varied as a direct function of variations in the rate of flow of secondary air prior to heating of the secondary air in the coil 50, it is possible to maintain the air-fuel ratio constant even though the mass air flow rate of burner air through the conduit 24 is varying.

To sense variations in the rate of secondary air flow at a predetermined constant reference temperature, a flow measuring apparatus 62 senses the rate of flow of secondary air at a location upstream from the coil 50. The flow measuring apparatus 62 includes a differential pressure multiplying regulator 64 (see FIGS. 1 and 3). The regulator 64 has a lower diaphragm chamber 68 (FIG. 3) which is connected with the upstream side of a metering orifice 70. An upper diaphragm chamber 72 of the regulator 64 is connected with the downstream side of the metering orifice 70.

Upon an increase in the rate of secondary air flow with a resulting increase in the pressure differential across the orifice 70, a valve 76 (see FIG. 3) in the pressure regulator 64 is opened. This increases the pressure supplied through a conduit 80 to a diaphragm type fuel pressure regulator valve 82. The increase in pressure transmitted to the regulator 82 increases the flow of gas to the burners 32 and 34 as a direct function of an increase in the flow of secondary air through the conduit 46.

Figure 3:
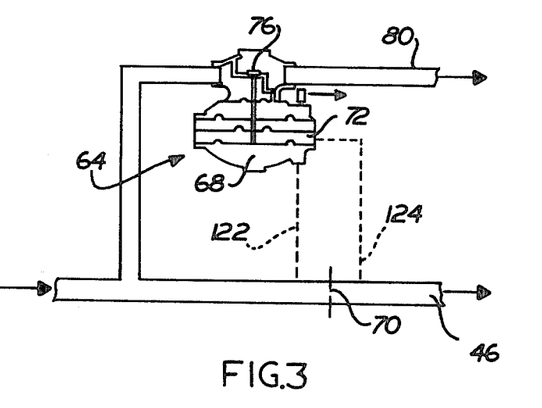
FIG. 3 is a schematic illustration of a pressure regulator which is used in the control system of FIG. 1.

Similarly, a decrease in the rate of secondary air flow through the metering orifice 70 results in activation of the regulator valve 76 to decrease the pressure in the conduit 80. The decrease in the pressure transmitted to the fuel flow regulator 82 activates the regulator to decrease the flow of fuel to the burners 32 and 34.

It should be noted that the secondary air has not been heated when it passes through the metering orifice 70. At this time the secondary air is at a substantially constant reference temperature. This results in the sensed variations in secondary air flow through the metering orifice 70 being proportional to variations in the mass flow rate of the secondary air. Since the mass flow rate of secondary air varies as a direct function of variations in the mass flow rate of burner air through the conduit 24, varying the flow of fuel with the flow regulator 82 as a function of variations in the secondary air flow results in the maintaining of a constant air-fuel ratio even though the temperature of the burner air increases.

In order to enable the flow of secondary air through the conduit 46 to simulate the flow of burner air through the conduit 24, it is necessary to maintain the pressure differential across the orifice 58 equal to the air pressure differential across the burners 32 and 34. To accomplish this, the pressure regulator 54 has a lower diaphragm chamber 86 (FIG. 1) which is supplied with a pressure signal from the burner air flow conduit 24 through a conduit 88. An upper diaphragm chamber 90 is supplied with a pressure signal from the downstream side of the coil 50 through a conduit 94. If there is a change in the pressure in the burner air flow conduit 24, the resulting change in the pressure in the diaphragm chamber 86 results in actuation of the pressure regulator valve 54 to change the pressure in the secondary air conduit 46 until the fluid pressure in the diaphragm chamber 90 is equal to the fluid pressure in the diaphragm chamber 86. Of course, at this time the pressure in the secondary air flow conduit 46 at orifice 58 is equal to the pressure in the burner air flow conduit 24.

Figure 4:
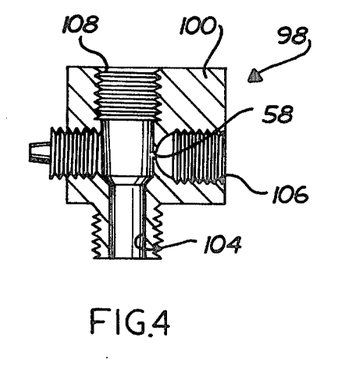
FIG. 4 is an enlarged sectional view illustrating the construction of a fitting which provides an orifice through which a heated flow of secondary air is directed.

Although it is contemplated that the control orifice 58 could be connected with the heating coil 50 and pressure regulator valve 54 in many different ways, this is advantageously accomplished by the use of a single orifice fitting 98 (see FIG. 4). The orifice fitting 98 has a body 100 in which the circular orifice 58 is formed. The upstream side of the orifice 58 is connected with the secondary air flow conduit 46 at the outlet from the heating coil 50 by a passage 104. The downstream side of the orifice 58 is connected with atmosphere through a passage 106. The air pressure on the upstream side of the orifice 58 is also connected to the conduit 94 leading to the pressure regulator 54 through a passage 108. It should be noted that in certain systems a back pressure may be present at the burners. If this is the case, the passage 106 is connected with a chamber containing air at this back pressure.

Although it is preferred to form the orifice 58 as an integral plug body 98 in the manner shown in FIG. 4 and to mount this plug body on the outlet of the heating coil 50, it is contemplated that the orifice 58 could be mounted in a different way if desired. However, it would be necessary to supply the orifice 58 with heated air from the coil 50 and to maintain the pressure differential across the orifice 58 equal to the pressure differential across the burner orifice in order to simulate the flow of heated burner air through the burners 32 and 34.

Figure 5:
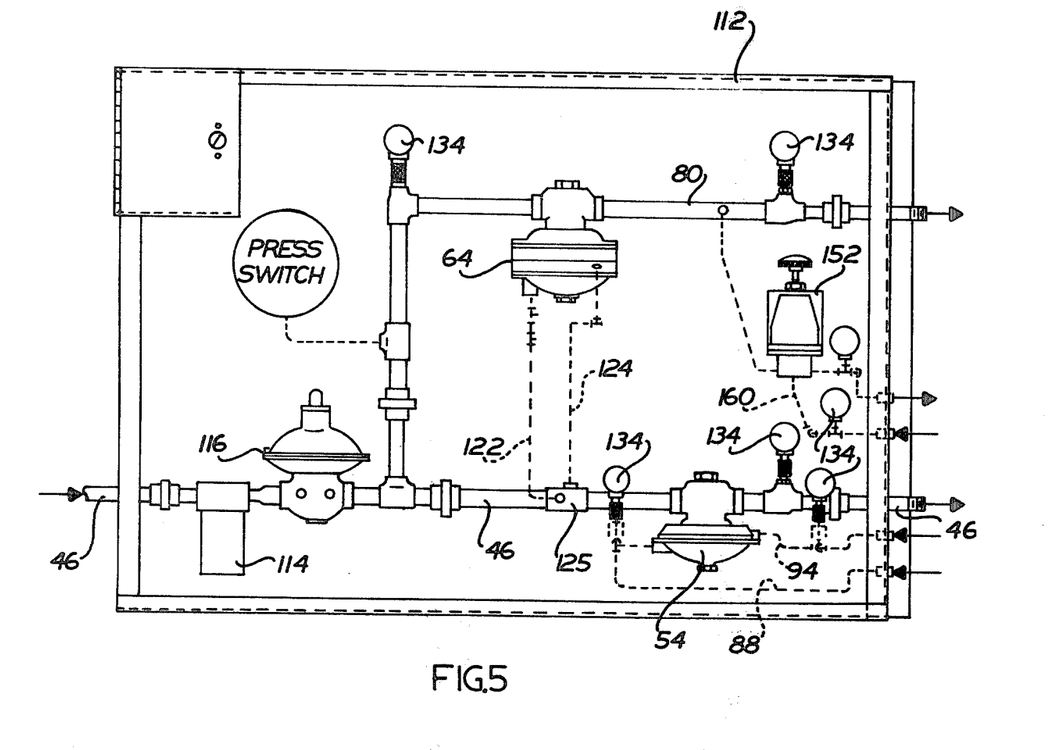
FIG. 5 is an illustration depicting the manner in which at least some of the control apparatus illustrated schematically in FIG. 1 can advantageously be mounted on a common base or frame to facilitate installation.

Although the various components of the secondary air flow system 44 could be arranged in many different ways, it is preferred to mount many of the components on a common base or frame 112 in the manner shown in FIG. 5. The secondary or control air conduit 46 extends across the base 112. The conduit 46 is connected with the pressure regulator 54 through an air filter 114 and maximum pressure regulator 116. The metering orifice 70 is disposed in a fitting 120 located upstream from the pressure regulator 54. The upstream side of the orifice 70 in the fitting 120 is connected with the bottom chamber of the pressure regulator 64 by a conduit 122. The downstream side of the orifice 70 is connected with the pressure regulator 64 by a conduit 124.

The pressure regulator 64 is supported on the frame 112 by the conduit 80. The conduit 80 extends outwardly from the frame 112 to the diaphragm type fuel flow pressure regulator 82 (see FIG. 1). Suitable pressure gauges 134 are provided at various points in the system to enable operating conditions to be checked.

In accordance with another feature of the invention, a burner air flow limiter control circuit 140 (FIG. 1) is provided to limit the amount of air supplied to the burners 32 and 34. When operation of the burners 32 and 34 is initiated, the recuperator 22 is ineffective to heat the air from the blower 18. At this time relatively dense air is supplied to the burners 32 and 34. With dense air, a substantial amount of fuel is required in order to maintain the desired air-fuel ratio. After the burners 32 and 34 have been operating and the recuperator 22 is effective to heat the burner air so that it has a lower density, less fuel is required to maintain the desired air-fuel ratio at the burners 32 and 34.

For reasons of both burner and blower air flow capacities, it is desirable to have the maximum cold air flow rate correspond to the maximum heated air flow rate. This is because many burners cannot efficiently mix air and fuel when the air flow rate exceeds a predetermined maximum rate. In addition, the blower 18 has a maximum cold air output which cannot be exceeded when the recuperator 22 is ineffective to heat the air from the blower. The burner air flow limiter control circuit 140 is effective to prevent the requirement of cold air in excess of burner and blower air flow capacities.

The burner air flow limiter control circuit 140 includes a valve 144 which is connected across the burner air flow conduit 24 and is actuated by pneumatic motor 146. The pneumatic motor 146 is operated to open the valve 144 by air pressure conducted through a conduit 148. When the burner air flow through the conduit 24 is to be reduced, the pressure in the conduit 148 is reduced and air pressure supplied through a conduit 149 is effective to operate the motor 146 to move the valve 144 toward the closed position. The pressure in the conduit 148 is controlled by a pressure limiting relay 152 and a temperature regulator 150 which limits the maximum temperature at which the burners 32 and 34 are operated. Temperature controller 150 is effective to reduce the pressure in the conduit 148 only when the burners are operating at a temperature in excess of a predetermined operating temperature.

The pressure limiting relay 152 is effective to throttle the air pressure supplied through the conduit 148 to a control valve 154 for the pneumatic motor 146. During normal operation of the limiter circuit 140, air under pressure is conducted from the conduit 149 through a conduit 160 and the pressure limiting relay 152 to the conduit 148 to the control valve 154 to actuate the motor 146 to open the valve 144. If the rate of flow of air to the burners 32 and 34 reaches a predetermined maximum flow, a pressure signal is transmitted through the conduit 158 to the pressure limiting relay 152. This signal is effective to cause a throttling of the fluid pressure transmitted to the conduit 148. This reduction of fluid pressure in the conduit 148 enables the pressure transmitted through the conduit 149 to the control valve 154 to actuate the pneumatic motor 146 and move the valve 144 toward a closed position. Valve 144 moves toward the closed position to prevent the flow of burner air through the conduit 24 from exceeding the maximum hot air flow.

The pressure for effecting operation of the relay 152 to reduce the air pressure in the conduit 148 is the same as the fuel demand pressure utilized to actuate the fuel flow regulator 82. Thus, the conduit 158 is connected with the conduit 80. The pressure in the conduit 80 is controlled by the differential pressure multiplying regulator 64 and varies with variations in the rate of flow of secondary or control air through the conduit 46. Since this pressure is utilized to actuate the fuel flow control regulator 82, the pressure signal is an accurate indication of the demand for fuel.

As the flow of simulated air in the conduit 46 increases as a result of an increase in the flow of burner air through the conduit 24, the demand for fuel increases. This results in an increase in the pressure in the conduit 80. When a predetermined maximum fuel demand is reached, the pressure in the conduit 80 is sufficient to cause the pressure limiting relay 152 to throttle the air pressure transmitted from the conduit 160 to the conduit 148 to thereby effect operation of the pneumatic motor 146 to partially close the valve 144 and thereby reduce the burner air flow.

In reducing the burner air flow, the limiter control circuit 140 cooperates with the secondary air flow system 44 to maintain the same air-fuel ratio. When the burner air flow is reduced by partially closing the valve 144, a reduction in the fuel flow rate occurs. This is because reducing the burner air flow reduces the pressure transmitted from the burner air flow conduit 24 to the pressure regulator 54 through the conduit 88. The resulting actuation of the pressure regulator 54 equalizes the pressure in the conduit 46 to the reduced pressure in the burner air flow conduit 24 downstream from the valve 144. Reducing the pressure in the conduit 46 reduces the pressure differential across the orifice 58 with a resulting decrease in the flow of secondary air through the conduit 46.

This reduction is secondary air flow causes the differential pressure multiplying regulator 64 to effect a reduction in the pressure in the conduit 80. Reducing the pressure in the conduit 80 effects operation of the fuel flow regulator valve 82 to reduce the rate of fuel flow to the burners 32 and 34. The reduction in the fluid pressure in the conduit 80 is also transmitted to the pressure limiting relay 152 to reduce the throttling action so that the motor 146 maintains the valve 144 in a partially closed position.

Although a pneumatic burner air flow limiting circuit 140 is satisfactory in operation, it is contemplated that it may be desired to utilize an electrical burner air flow limiting circuit in association with the burner air flow control valve 144. Such a burner air flow limiting circuit is designated by the numeral 180 in FIG. 6.

Figure 6:
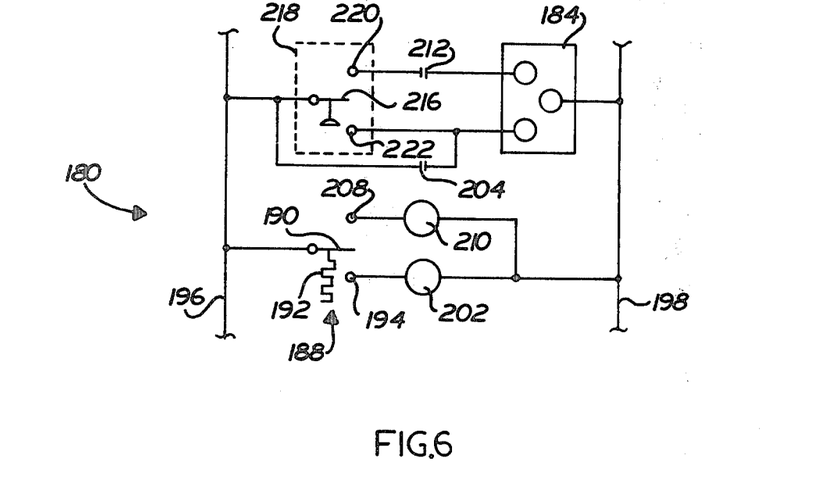
FIG. 6 is a schematic illustration of another embodiment of the invention in which electrical control circuitry is utilized to limit burner air flow.

The burner air flow limiting circuit 180 includes a reversible electric motor 184 which is connected with the burner air flow control valve 144. A temperature controller 188 is provided in association with the motor 184. The temperature controller 188 corresponds to the temperature controller 150 of FIG. 1 and includes a movable contact 190 which is actuated by a suitable thermostatic control 192. When the temperature of the burners 32 and 34 exceeds a predetermined maximum temperature, the movable contact 190 engages a fixed contact 194 to complete a circuit between a pair of power lines 196 and 198 and effect energization of a relay 202. Energization of the relay 202 closes its normally open contacts 204 to complete a circuit to effect energization of the motor 184 to move the burner air flow control valve 144 toward a closed position. When the temperature of the burners 32 and 34 has dropped below the predetermined maximum temperature, the contact 190 moves away from the fixed contact 194 into engagement with a second fixed contact 208 to effect energization of a relay 210 and closing of its normally open contacts 122.

Assuming that there is not an excessive demand for burner air and fuel, a movable contact 216 of a pressure actuated relay 218 engages a fixed contact 220. This effects energization of the motor 184 to move the control valve 144 back to its fully open position. As the demand for fuel increases, the pressure signal transmitted from the conduit 80 increases and effects movement of the contact 216 away from the stationary contact 220 toward a second stationary contact 222. When there is an excessive demand for fuel, the pressure transmitted from the conduit 80 causes the movable contact 216 to engage the fixed contact 222. This completes a circuit to energize the electric motor 184 to move the burner air flow control valve toward a closed position. When the demand for fuel has been reduced below a predetermined maximum level, the air pressure signal is ineffective to maintain the movable contact 216 in engagement with the fixed contact 222 and the motor 184 is deenergized.

It should be noted that the temperature controller 188 can effect energization of the motor 184 to reduce burner air flow in the event of excessive temperatures even though the demand for fuel is not in excess of the predetermined maximum fuel flow rate. This is because energization of the relay 202 closes the contacts 204 to energize the motor 184 to close the valve 144 even though the demand for fuel is not excessive. During normal operating conditions of the burners 32 and 34, that is when they are not operating at excessive temperatures and when excessive fuel flow is not being demanded, the two movable contacts 190 and 216 move in a null range between the associated fixed contacts and the motor 184 is deenergized with the valve 144 in an open condition.

In view of the foregoing description it is apparent that the control assembly 40 is effective to vary the flow of fuel to the burners 32 and 34 to maintain a predetermined air-fuel ratio even though the density of the air supplied to the burners 32 and 34 decreases as the recuperator 22 becomes effective to heat the air. This is accomplished by using the secondary air flow system 44 to simulate the burner air flow. Since the rate of flow of air in the secondary air flow system varies in direct proportion to variations in the burner air flow, sensing the rate of flow of the secondary air at a constant or reference temperature enables the differential pressure multiplying regulator 64 to provide a control signal which varies as a direct function of variations in the burner air mass flow rate. This signal is transmitted through the conduit 80 to the fuel flow regulator 82 to vary the flow of fuel to the burners 32 and 34. This results in the air-fuel ratio being maintained constant even though the density of the burner air and the burner air mass flow rate varies.

The secondary or control air flow system 44 is able to simulate the burner air flow to the burners 32 and 34 since the flow of air through the orifice 58 will simulate the flow of air through the orifices in the burners 32 and 34. In order to have the flow of air through the orifice 58 vary as a direct function of variations in the flow of air through the orifices in the burners 32 and 34, the pressure differential across the orifice 58 is maintained the same as the pressure differential across the orifices in the burners 32 and 34. The temperature and density of the air conducted through the orifice 58 is the same as the temperature and density of the air conducted through the burner orifices.

The pressure differential across the orifice 58 is maintained the same as the pressure differential across the air flow orifices and the burners 32 and 34 by means of the pressure regulator valve 54. The pressure regulator valve 54 senses the burner air flow pressure in the conduit 24 downstream from the burner air flow control valve 144. In addition, the pressure regulator 54 senses the fluid pressure immediately upstream from the orifice 58. A diaphragm in the pressure regulator 54 actuates the pressure regulator valve to maintain the fluid pressure immediately upstream from the orifice plate 58 equal to the fluid pressure which is conducted to the burner air flow orifices in the burners 32 and 34.

To maintain the density of the air conducted through the orifice plate 58 equal to the density of the air supplied to the burners 32 and 34, the heating coil 50 is mounted in the burner air flow conduit 24. The heating coil 50 is effective to heat the secondary or control flow of air conducted to the orifice 58 to the same temperature as the burner air flow.

Since the maintaining of a desired air-fuel ratio with a relatively dense cool air requires substantially more fuel than the maintaining of an air-fuel ratio with less dense heated air, a burner air flow limiting circuit 140 is advantageously utilized in association with the control assembly 40. The burner air flow limiting circuit 140 is effective to actuate a control valve 144 to limit the maximum air flow rate to the burners 32 and 34 to a rate which does not exceed the maximum hot air flow. The burner and air flow limiting circuit 140 can be of either the pneumatic type illustrated in FIG. 1 or the electrical type illustrated in FIG. 6. Of course other types of burner air flow limiting circuits could be utilized. Although the control assembly 40 has been described herein in connection with burners which are supplied with gas for fuel, it is contemplated that the control assembly could be utilized in association with burners supplied with liquid fuel such as oil.

Having described a specific preferred embodiment of the invention, the following is claimed:

1. A method of controlling the air-fuel ratio for a burner, said method comprising the steps of establishing a primary flow of air to the burner, establishing a flow of fuel to the burner, simulating the primary air flow with a secondary air flow, and maintaining a desired air-fuel ratio at the burner by regulating the flow of fuel to the burner as a function of the secondary air flow.

2. A method as set forth in claim 1 wherein said step of simulating the primary air flow with a secondary air flow includes the step of varying the pressure and density of the air in the secondary air flow as a function of variations in the pressure and density of the air in the primary air flow.

3. A method as set forth in claim 1 further including the step of heating the primary flow of air, said step of simulating the primary air flow with a secondary air flow includes the step of heating the secondary air flow to a temperature which varies as a function of variations in the temperature of the heated air in the primary air flow.

4. A method as set forth in claim 3 wherein said step of simulating the primary air flow with a secondary air flow further includes the steps of conducting the heated secondary flow of air through an orifice and maintaining the air pressure differential across the orifice equal to the air pressure differential across the burner.

5. A method as set forth in claim 4 wherein said step of regulating the flow of fuel to the burner as a function of the secondary air flow includes the step of sensing the rate of secondary air flow prior to performing said step of heating the secondary air flow.

6. A method as set forth in claim 5 wherein said step of regulating the flow of fuel to the burner as a function of the secondary air flow further includes providing a pneumatic control signal which varies in pressure as a function of variations in the rate of secondary air flow.

7. A method as set forth in claim 5 further including the step of limiting the primary air flow to a rate which corresponds to a predetermined rate of secondary air flow as determined by performing said step of sensing the rate of secondary air flow.

8. A method as set forth in claim 3 wherein said step of regulating the flow of fuel to the burner as a function of the secondary air flow includes the step of sensing the rate of secondary air flow at a predetermined reference temperature prior to performing said step of heating the secondary air flow.

9. A method of controlling the air-fuel ratio for at least one burner of a plurality of burners which are supplied with air from a common source, said method comprising the steps of establishing a main flow of air from the common source, heating the main flow of air to a temperature which is above a predetermined reference temperature, dividing the heated main flow of air into a plurality of burner air flows including one burner air flow which is conducted to at least the one burner of the plurality of burners, providing a control signal which varies as a function of variations in the air mass flow rate of heated air in the one burner air flow, establishing a flow of fuel to the burners, and varying the rate of flow of fuel to at least the one burner which receives air from the one burner air flow as a function of variations in said control signal to maintain a predetermined air-fuel ratio at the one burner with variations in temperature of the air in the one burner air flow.

10. A method as set forth in claim 9 wherein said step of providing a control signal which varies as a function of variations in the air mass flow rate of heated air in the one burner air flow includes the step of varying the control signal as a function of variations in the pressure and density of the heated air in the one burner air flow.

11. A method as set forth in claim 9 wherein said step of providing a control signal which varies as a function of variations in the air mass flow rate of heated air in the one burner air flow includes the steps of simulating the flow of air in the one burner air flow with a secondary flow of air, said step of varying the rate of flow of fuel to at least the one burner includes the step of varying the rate of flow of fuel to the one burner as a function of variations in the characteristics of the secondary flow of air.

12. A method as set forth in claim 11 wherein said step of simulating the rate of flow of air in the one burner air flow with a secondary flow of air includes the steps of heating the secondary flow of air to the same temperature as the air in the one burner air flow, conducting the heated secondary flow of air through an orifice, and maintaining the air pressure differential across the orifice equal to the air pressure differential across the one burner.

13. A method as set forth in claim 12 wherein said step of providing a control signal which varies as a function of variations in the air mass flow rate of heated air in the one burner air flow includes the step of sensing the rate of secondary flow of air at the reference temperature prior to performing said step of heating the secondary flow of air.

14. A method as set forth in claim 13 wherein said step of providing a control signal which varies as a function of variations in the air mass flow rate of heated air in the one burner air flow includes the step of providing a pneumatic signal which varies in pressure as a function of variations in the rate of secondary flow of air at the reference temperature.

15. A method as set forth in claim 13 further including the step of limiting the rate of flow of air in the one burner air flow to a maximum rate which results in a predetermined maximum flow rate of secondary air at the reference temperature.

16. A method as set forth in claim 9 further including the step of limiting the rate of flow of heated air in the one burner air flow to a maximum air flow rate which corresponds to a predetermined mass air flow rate.

17. A method as set forth in claim 9 wherein said step of providing a control signal which varies as a function of variations in the mass air flow rate in the one burner air flow includes the step of providing a secondary flow of air and varying the pressure and temperature of the air in the secondary flow of air as a function of variations in the pressure and temperature of the air in the one burner air flow.

18. A method as set forth in claim 17 wherein said step of providing a control signal which varies as a function of variations in the mass air flow rate in the one burner air flow includes the step of providing a signal which varies as a function of variations in the rate of air flow in the secondary flow of air.

19. A method as set forth in claim 17 further including the step of limiting the rate of flow of heated air in the one burner air flow to a maximum rate which corresponds to a maximum rate of flow of air at the reference temperature in the secondary air flow.

20. A method as set forth in claim 9 further including the step of conducting the one burner air flow to a plurality of burners, said step of varying the rate of fuel flow to at least the one burner including the step of varying the fuel flow to each of the burners supplied with air from the one burner air flow.

21. An apparatus for controlling the air-fuel ratio for a burner, said apparatus comprising blower means for establishing a primary flow of air, primary conduit means for conducting the primary flow of air to the burner, fuel supply means for establishing a flow of fuel to the burner, means for providing a secondary air flow, and control means for simulating the primary air flow with the secondary air flow and for regulating the flow of fuel to the burner as a function of the secondary air flow.

22. An apparatus as set forth in claim 21 wherein said control means includes means for varying the pressure and density of the air in the secondary air flow as a function of variations in the pressure and density of the air in the primary air flow.

23. An apparatus set forth in claim 21 further including primary heater means for heating the primary flow of air, said control means including secondary heater means for heating the secondary air flow to a temperature which varies as a function of variations in the temperature of the heated air in the primary air flow.

24. An apparatus as set forth in claim 23 wherein said control means further includes an orifice, secondary conduit means for conducting the heated secondary flow of air to said orifice, and means for maintaining the air pressure differential across said orifice equal to the air pressure differential across the burner.

25. An apparatus as set forth in claim 24 wherein said control means further includes sensor means for sensing the rate of secondary air flow to said secondary heater means and means for providing a fuel flow control signal which varies as a function of the rate of secondary air flow to said secondary heater means.

26. An apparatus as set forth in claim 25 further including means for limiting the primary air flow to a rate which corresponds to a predetermined rate of secondary air flow.

27. An apparatus for use in controlling the air-fuel ratio for at least one burner of a plurality of burners, said apparatus comprising blower means for establishing a primary flow of air, primary heater means connected in fluid communication with said blower means for heating the primary flow of air, burner air conduit means connected with said primary heater means for dividing the primary flow of heated air into a plurality of burner air flows and for conducting the plurality of burner air flows to the plurality of burners, fuel conduit means for conducting a flow of fuel to the plurality of burners, and control means connected with said burner air conduit means and said fuel conduit means for sensing variations in the air mass flow rate of heated air in the burner air flow conducted to at least the one burner and for varying the rate of flow of fuel to at least the one burner as a function of variations in the sensed air mass flow rate of heated air in the burner air flow conducted to at least the one burner to maintain a predetermined air-fuel ratio at the one burner with variations in the temperature of the air in the burner air flow conducted to the one burner.

28. An apparatus as set forth in claim 27 wherein said control means includes means for providing a control signal which varies as a function of variations in the pressure and density of the heated air flow conducted to at least the one burner and means responsive to said control signal to vary the rate of flow of fuel to at least the one burner upon variations in said control signal.

29. An apparatus as set forth in claim 27 wherein said control means includes means for simulating the flow of air in the burner air flow conducted to at least the one burner with a secondary air flow and means for varying the rate of flow of fuel to at least the one burner as a function of variations in the characteristics of the secondary air flow.

30. An apparatus as set forth in claim 29 wherein said means for simulating the flow of air conducted to at least the one burner with a secondary air flow includes secondary heater means for heating the secondary flow of air to the same temperature as the heated air conducted to at least the one burner, an orifice, secondary air conduit means for conducting a flow of the heated secondary air to said orifice, and means for maintaining the air pressure differential across said orifice equal to the air pressure differential across the one burner.

31. An apparatus as set forth in claim 30 wherein said means for varying the rate of flow of fuel as a function of variations in the characteristics of the secondary air flow includes means for sensing the rate of secondary air flow to the secondary heater means at a predetermined reference temperature.

32. A method of controlling the air-fuel ratio for a burner, said method comprising the steps of supplying heated air to the burner at a maximum volumetric air flow rate, supplying fuel to the burner at a maximum fuel flow rate simultaneously with performance of said step of supplying heated air to the burner to obtain a predetermined air-fuel ratio, supplying relatively cold air to the burner, and limiting the flow of relatively cold air to the burner to a volumetric flow rate which is less than maximum volumetric flow rate of heated air to obtain said predetermined air-fuel ratio with said maximum fuel flow rate.

33. A method as set forth in claim 32 wherein said step of supplying heated air to the burner at a maximum volumetric air flow rate includes the step of supplying air to the burner at a predetermined maximum air mass flow rate, said step of limiting the flow of relatively cold air to the burner includes the step of limiting the flow of relatively cold air to said predetermined maximum air mass flow rate.

34. A method as set forth in claim 32 further including the steps of simulating the flow of air to the burner with a secondary air flow and varying the flow rate of fuel to the burner as a function of variations in the rate of flow secondary air, said step of limiting the flow of relatively cold air to the burner including the step of limiting the flow rate of relatively cold air to a flow rate which corresponds to a predetermined maximum flow rate of secondary air.

35. A method as set forth in claim 34 wherein said step of simulating the flow of air to the burner with a secondary air flow includes the steps heating the secondary air flow to a temperature which is the same as the air supplied to the burner, maintaining the secondary air flow at the same pressure air supplied to the burner, and directing the secondary air flow through an orifice.

36. An apparatus for use in controlling the air-fuel ratio for a burner, said apparatus comprising means for establishing a primary flow of air to the burner, means for establishing a flow of fuel to the burner, means for simulating the primary air flow with a secondary air flow, and means for maintaining a desired air-fuel ratio at the burner, said means for maintaining a desired air-fuel ratio at the burner including means for regulating the flow of fuel to the burner as a function of the secondary air flow.

37. An apparatus for controlling the air-fuel ratio for at least one burner of a plurality of burners which are supplied with air from a common source, said apparatus comprising means for establishing a main flow of air from the common source, means for heating the main flow of air to a temperature which is above a predetermined reference temperature, means for dividing the heated main flow of air into a plurality of burner air flows including one burner air flow which is conducted to at least the one burner of the plurality of burners, means for providing a control signal which varies as a function of variations in the air mass flow rate of heated air in the one burner air flow, means for establishing a flow of fuel to the burners, and means for varying the rate of flow of fuel to at least the one burner which receives air from the one burner air flow as a function of variations in said control signal to maintain a predetermined air-fuel ratio at the one burner with variations in temperature of the air in the one burner air flow.

38. An apparatus for controlling the air-fuel ratio for a burner, said apparatus comprising means for supplying heated air to the burner at a maximum volumetric air flow rate, means for supplying fuel to the burner at a maximum fuel flow rate simultaneously with performance of said step of supplying heated air to the burner to obtain a predetermined air-fuel ratio, means for supplying relatively cold air to the burner, and means for limiting the flow of relatively cold air to the burner to a volumetric flow rate which is less than maximum volumetric flow rate of heated air to obtain said predetermined air-fuel ratio with said maximum fuel flow rate.

39. An apparatus as set forth in claim 38 wherein said means for supplying heated air to the burner at a maximum volumetric air flow rate includes means for supplying air to the burner at a predetermined maximum air mass flow rate, said means for limiting the flow of relatively cold air to the burner includes means for limiting the flow of relatively cold air to said predetermined maximum air mass flow rate.

40. An apparatus as set forth in claim 38 further including means for simulating the flow of air to the burner with a secondary air flow and for varying the flow rate of fuel to the burner as a function of variations in the rate of flow secondary air, said means for limiting the flow of relatively cold air to the burner including means for limiting the flow rate of relatively cold air to a flow rate which corresponds to a predetermined maximum flow rate of secondary air.

41. An apparatus as set forth in claim 40 wherein said means for simulating the flow of air to the burner with a secondary air flow includes means for heating the secondary air flow to a temperature which is the same as the air supplied to the burner, means for maintaining the secondary air flow at the same pressure air supplied to the burner, and means for directing the secondary air flow through an orifice.

* * * * *